3,801,501
METHOD OF PURIFYING WATER
Sterling R. Kennedy, 3460 Hollenberg Drive,
Bridgeton, Mo. 63044
No Drawing. Continuation-in-part of abandoned application Ser. No. 206,953, Dec. 10, 1971. This application Feb. 14, 1972, Ser. No. 226,187
Int. Cl. C02b 1/18
U.S. Cl. 210—59    17 Claims

ABSTRACT OF THE DISCLOSURE

A method of purifying water is provided which is applicable to sewerage or other polluted water to convert it to potable water. The method involves the acidification of the polluted water with a mineral acid such as sulfuric, nitric, hydrochloric, or mixtures thereof, treatment of the mixture with iron to produce an iron salt in situ, followed by neutralization. An iron or aluminum nitrate or sulfate may be added to the mixture when it is treated with the iron.

BACKGROUND OF THE INVENTION

This application relates to the treatment of polluted water such as sewerage or other impure water to convert it into potable water which can be either used as such or discharged into rivers or other water supplies without causing deterioration or harm to the supply.

This application is a continuation-in-part of my copending application Ser. No. 206,953, filed Dec. 10, 1971, and now abandoned.

One of the basic requirements for carrying out industrial processes and for use by the population is a supply of fresh water such as provided by rivers, streams, etc. This supply is not infinite and there has been a growing and even more important need to conserve fresh water supplies, use them as needed but restore the water to the environment in a reusable form. Many procedures have been proposed to accomplish this result but they have all had one or more drawbacks such as the expense requisite, the time consumed and the unsatisfactory results achieved. The need for an inexpensive, rapid but effective means for treating polluted water therefore remains.

SUMMARY OF THE INVENTION

Among the objects of the present invention are the provision of an effective but inexpensive process for treating polluted water to render it potable or otherwise unobjectionable when discarded. A further object is to provide a method of the type indicated which is readily, quickly and inexpensively carried out with easily available materials and which requires a comparatively simple and therefore inexpensive assembly of apparatus. Other objects will be in part apparent and in part pointed out hereinafter.

The invention accordingly comprises the methods hereinafter described, the scope of the invention being indicated in the following claims.

According to the present invention polluted water which is relatively free of solid waste components is purified by first treating the water with a mineral acid such as sulfuric, nitric or hydrochloric acid or mixtures thereof to lower its pH to at least 2.5. The water is maintained at this pH for a sufficient length of time to destroy bacteria and similar pollutants frequently found in sewerage and also to destroy some of the small organic particles therein. The water is then treated with iron in a form such that the iron can be in part consumed by the acid in the water thereby adding an iron salt to the water and increasing the pH to about 3.5, for example. The mixture is maintained in this form sufficiently long for the iron salt to be formed. The mixture is then neutralized with an alkali, thereby raising the pH to approximately neutrality.

After settling, the resulting effluent is potable and will not adversely affect the environment if then discharged but it is preferably further treated in known ways to improve its clarity and/or hardness for subsequent use.

DETAILED DESCRIPTION OF THE INVENTION

The polluted water is first mechanically treated to clarify it and remove most of the suspended or retained solids, thereby facilitating the purification process of the present invention. The so treated water is mixed with sulfuric acid to decrease the pH to 2.5 and the acidified water is maintained at this pH for at least 3½ minutes. The effluent from this step is monitored so that the pH can be maintained at the desired point. Maintenance of the desired pH is accomplished by introducing a further amount of sulfuric acid during the period before the next step if the pH begins to rise above the selected pH.

The acid-containing water is then brought in contact with a source of iron such as iron bars, iron plates, or scrap iron in sufficient quantity to have 3.2 square feet of surface of the iron exposed to the acid liquid for every gallon per minute flow. The reaction with the iron takes place during the retention time of 6 minutes in the iron treatment tank. The pH rises to about 3.5. In a preferred embodiment a small quantity of an iron or aluminum nitrate or sulfate, formed in situ, is mixed with the acid-containing water during reaction with the iron.

After the iron treatment the water is neutralized utilizing ammonia. The water is thoroughly mixed with the ammonia so that the neutralizing is effective throughout and the water is brought to a pH of at least 7. In lieu of ammonia, sodium hydroxide, barium hydroxide or potassium hydroxide may be substituted.

The effluent from this process is purified to the point where it is potable but it is improved if the floc which forms is permitted to settle. The iron salt in the water acts as a flocculating agent but other flocculating agents such as aluminum sulfate may be added as well, if desired.

The water may also be subsequently treated with chlorine and also mechanically degasified to improve the quality of the effluent. These steps can be carried out with the customary filter beds, activated charcoal, etc.

The following examples illustrate the invention.

EXAMPLE 1

After mechanical removal of the contained solids, domestic sewerage is added to a tank along with sulfuric acid. The sulfuric acid is 66° Bé. acid and may be used undiluted or in a dilution of 1 to 1 to 1 to 10, depending upon the type of piping and controls that are used. The mixture is fed into a tank, the outlet of which has a pH sensor which monitors the pH of the effluent therefrom. The initial proportion of acid mixed with the sewerage is computed to bring the pH of the mixture to 2.5. A port intermediate the chamber feeds an additional quantity of the acid solution whenever the reading of the pH sensor at the outlet rises above the selected figure. The mixture of sewerage water and sulfuric acid solution is retained in the tank for at least 3½ minutes. Since the controls maintain the pH at the selected point, this kills any bacteria in the sewerage and also destroys any small organic particles which may be present. The tank in which the foregoing is carried out is constructed of acid-resistant material as are the subsequent connections and the following tank. The effluent from the acid-treatment tank is then fed to an iron-containing tank having at least 3.2 square feet of iron surface exposed to the acid liquid for every gallon per minute flow. The iron should have a 10/10 rating (10 parts of iron to 10 parts of carbon) and the acid liquid is kept in the iron-containing tank for 6 minutes. This enables the acid to react with the iron, raising the pH of the liquid to 3.5 by the time that it exits from the tank. The effluent from the iron-reaction tank is then discharged into a neutralizing tank where ammonia is added to raise the pH to 7. The mixing tank includes a mechanical mixer which thoroughly distributes the ammonia throughout the liquid during the 3½ minutes that the liquid remains in the tank. This neutralizing tank may be constructed of steel or concrete, if the ammonia is injected into the invert pipe, rather than the acid-resistant materials employed for the acid tank and iron tank.

The treated effluent then passes to a floc tank in which it is retained for 40 minutes to enable the iron floc to form and settle. The purified water then passes to a chlorination tank and then to a stripping tower where the gasses dissolved in or retained by the liquid are removed. It is then filtered through a sand filter and then an activated carbon filter, followed by a final chlorination, if desired. Either with or without the final chlorination, the water is sufficiently pure to meet all state and federal standards.

EXAMPLE 2

Example 1 is repeated but after addition of the acid the effluent is transferred to an iron-containing tank which in addition to the iron content includes an iron reactor pot in the tank. 46° Bé. nitric acid and water are metered into this pot which contains soft iron ingots. The nitric acid reacts with the iron to form ferrous nitrate which then flows into the sulfuric acid-containing solution which has come into the iron tank. The ferrous nitrate solution mixes with the sulfuric acid solution and further reacts with the iron in the main tank. As in Example 1, the effluent is thus brought to a pH of approximately 3.5 before it is discharged to the neutralizing tank. The remaining portion of the process is carried out in the same fashion as Example 1. The neutralized solution from the neutralizing tank quickly develops a heavy rapidly settling floc when it is passed to the floc tank. This floc settles to the bottom of the floc tank from which it can be removed and the purified water is then treated in the manner set forth in Example 1. The water product is sufficiently pure to meet all state and federal standards.

EXAMPLE 3

Example 1 is repeated but hydrochloric acid is substituted for the sulfuric acid. The amount of hydrochloric acid is calculated to reduce the pH of the water to be treated to 2.5 and the process is otherwise carried out in the same manner as Example 1. Similar results are secured.

EXAMPLE 4

Example 1 is repeated but nitric acid is substituted for the sulfuric acid. The amount of nitric acid is similarly calculated to bring the pH to 2.5. The process is otherwise conducted in the same way as Example 1 and similar results are secured.

EXAMPLE 5

Example 2 is repeated but hydrochloric acid is substituted for the sulfuric acid. The amount of hydrochloric acid is calculated to reduce the pH of the water to be treated to 2.5 and the process is otherwise carried out in the same manner as Example 2. Similar results are secured.

EXAMPLE 6

Example 2 is repeated but nitric acid is substituted for the sulfuric acid. The amount of nitric acid is similarly calculated to bring the pH to 2.5. The process is otherwise conducted in the same way as Example 2 and similar results are secured.

EXAMPLE 7

Example 1 was repeated but in lieu of the ammonia added in the neutralizing tank a 50% solution of sodium hydroxide was mixed with the effluent from the iron-reaction tank. Sufficient sodium hydroxide solution was added to the effluent to raise the pH to above 7. As in Example 1, a mechanical mixer thoroughly distributed the sodium hydroxide solution throughout the liquid during the 3½ minutes that the liquid remains in the tank.

If greater fluidity in the sodium hydroxide solution is desired the 50% solution can first be mixed with an equal amount of water and the resulting 25% solution utilized in the neutralizing tank.

EXAMPLE 8

Example 7 was repeated but barium hydroxide was employed in place of sodium hydroxide. The concentration of barium hydroxide in the solution added to the neutralizing tank can be varied provided the proportion added is such as to raise the pH to at least 7.

EXAMPLE 9

Example 2 is repeated but the iron reactor pot contains aluminum bars rather than soft iron ingots. The nitric acid reacts with the aluminum bars to form aluminum nitrate solution which then flows into the sulfuric acid-containing solution which has come from the iron tank. The process is otherwise similar to that of Example 2 and similar results are secured.

EXAMPLE 10

Example 2 is repeated but 66° Bé. sulfuric acid and water are metered into the iron reactor pot rather than 46° Bé. nitric acid and water. The sulfuric acid reacts with the soft iron ingots to form ferrous sulfate solution which then flows into the sulfuric acid-containing solution which has come into the iron tank. The process is otherwise similar to Example 2 and similar results are secured.

EXAMPLE 11

Example 10 is repeated but the iron reactor pot contains aluminum bars rather than soft iron ingots. The sulfuric acid reacts with the aluminum bars to form aluminum sulfate solution which then flows into the sulfuric acid-containing solution which has come into the iron tank. The process is otherwise similar to Example 10 and similar results are secured.

As indicated previously, mixtures of two or more of the mineral acids mentioned above can be employed, if desired. Such mixtures are first prepared and then added to the water from which contained solids have been removed. The pH of the so treated water is brought to an acidity of at least pH 2.5. When the procedure is carried out as set forth in the foregoing examples, utilization of such mixtures of acids provides similar results. The polluted water is in each instance converted to potable water which can either be employed for a further desired use or may be discharged into the environment without causing pollution.

Instead of a single neutralizing alkali such as ammonia, sodium hydroxide, barium hydroxide or potassium hydroxide, two or more of these may be utilized. Unlike the acids, however, the alkalis should be added to the neutralizing tank at different locations.

Both soft iron ingots and aluminum bars may be utilized simultaneously in the iron reactor pot in the iron-containing tank, if desired, and mixtures of acids may be metered into this pot to react with the iron ingots and/or aluminum bars. In all instances improved flocs form after neutralization in the neutralization tank. Such flocs quickly develop in the effluent from the neutralizing tank and can be easily removed from the bottom of the floc tank.

Under some circumstances it is preferable to add chlorine to the neutralizing tank as well as adding alkali at this point. In such instances the chlorination tank following the floc tank may be omitted. Addition of the chlorine to the neutralizing tank appears to improve the subsequent formation of a floc, thereby providing a clearer effluent from the floc tank.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. The method of treating water from sewerage which is relatively free of solid waste which consists essentially of mixing with said water a sufficient quantity of a mineral acid, selected from the group consisting of sulfuric acid, nitric acid, hydrochloric acid and mixtures thereof, to lower the pH of said water at least to 2.5, maintaining said pH of the mixture for a sufficient time to destroy bacteria present, subsequently bringing the mixture into contact with the surface of an acid soluble form of iron for a length of time sufficient for the iron to react with part but not all of said acid and increase the pH of the mixure to about 3.5, and then raising the pH of said mixture to obout 7 by adding an alkali.

2. The method of claim 1 in which the mixture of water and acid has a pH of approximately 2.5.

3. The method of claim 1 in which the mixture of acid and water is held for at least 3½ minutes to destroy bacteria present.

4. The method of claim 3 in which the mixture of acid and water is subsequently brought into contact with at least 3.2 square feet of iron per gallon per minute of acid and water mixture.

5. The method of claim 4 in which the mixture after reaction with the iron has a pH of about 3.5.

6. The method of claim 5 in which the mixture after reaction with the iron is neutralized with ammonia.

7. The method of claim 1 in which the mixture of acid and water is brought into contact with the iron and an aqueous solution of ferrous nitrate at the same time.

8. The method of claim 7 in which the mixture of water and acid has a pH of approximately 2.5.

9. The method of claim 8 in which the mixture of acid and water is held for at least 3½ minutes to destroy bacteria present.

10. The method of claim 9 in which the mixture of acid and water is subsequently brought into contact with at least 3.2 square feet of iron per gallon per minute of said acid and water mixture.

11. The method of claim 10 in which the mixture after reaction with the iron has a pH of about 3.5.

12. The method of claim 11 in which the mixture after reaction with the iron is neutralized with ammonia.

13. The method of claim 5 in which the mixture after reaction with the iron is neutralized with sodium hydroxide.

14. The method of claim 5 in which the mixture after reaction with the iron is neutralized with barium hydroxide.

15. The method of claim 11 in which the mixture after reaction with the iron is neutralized with sodium hydroxide.

16. The method of claim 11 in which the mixture after reaction with the iron is neutralized with barium hydroxide.

17. The method of claim 1 in which the mixture of acid and water is brought into contact with the iron and with an aqueous solution of at least one salt selected from the group consisting of iron nitrates and sulfates and aluminum nitrates and sulfates, at the same time.

References Cited
UNITED STATES PATENTS

| | | | |
|---|---|---|---|
| 3,521,752 | 7/1970 | Lindman | 210—50 |
| 3,575,853 | 4/1971 | Gaughan et al. | 210—61 X |

SAMIH N. ZAHARNA, Primary Examiner

B. CASTEL, Assistant Examiner

U.S. Cl. X.R.

210—61